(12) United States Patent
Masuda (10) Patent No.: US 11,105,050 B2
(45) Date of Patent: Aug. 31, 2021

(54) ROAD SURFACE MANAGEMENT SYSTEM AND ROAD SURFACE MANAGEMENT METHOD

(71) Applicant: HITACHI CONSTRUCTION MACHINERY CO., LTD., Tokyo (JP)

(72) Inventor: Koutarou Masuda, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 368 days.

(21) Appl. No.: 16/328,900

(22) PCT Filed: Feb. 27, 2018

(86) PCT No.: PCT/JP2018/007380
§ 371 (c)(1),
(2) Date: Feb. 27, 2019

(87) PCT Pub. No.: WO2018/180136
PCT Pub. Date: Oct. 4, 2018

(65) Prior Publication Data
US 2019/0186086 A1    Jun. 20, 2019

(30) Foreign Application Priority Data

Mar. 31, 2017  (JP) .............................. JP2017-070650

(51) Int. Cl.
*E01C 23/00*        (2006.01)
*G07C 5/00*         (2006.01)
(Continued)

(52) U.S. Cl.
CPC ............ *E01C 23/00* (2013.01); *G06Q 10/00* (2013.01); *G06Q 10/04* (2013.01); *G06Q 10/20* (2013.01);
(Continued)

(58) Field of Classification Search
CPC ........ G06Q 10/20; G06Q 50/08; G06Q 50/30; G07C 5/008; E01C 23/00
See application file for complete search history.

(56) References Cited

U.S. PATENT DOCUMENTS 5,737,215 A * 4/1998 Schricker ............... G07C 5/008
                                                           700/29
6,959,235 B1 * 10/2005 Abdel-Malek ...... B61L 27/0094
                                                          701/29.4
(Continued)

FOREIGN PATENT DOCUMENTS

| JP | 2000110111 | 4/2000 |
| JP | 2005115687 | 4/2005 |
| JP | 2012073810 | 4/2012 |
| JP | 2013105278 | 5/2013 |
| JP | 2016139412 | 8/2016 |

OTHER PUBLICATIONS

International Search Report of PCT/JP2018/007380 dated May 29, 2018.

*Primary Examiner* — Abigail A Risic
(74) *Attorney, Agent, or Firm* — Mattingly & Malur, PC (57) ABSTRACT

Every time the haulage vehicle position data and the road surface condition data are received from a haulage vehicle 120, the segment including a position specified by the haulage vehicle position data, a reception time, and the road surface condition data are associated with one another for accumulation. Every time the repair vehicle position data and the work status data indicating a working state are received from a repair vehicle 130, the road surface condition data associated with the segment including a position specified by the accumulated repair vehicle position data is reset. Every time the road surface condition data is newly accumulated, a prediction function is determined to predict a chronological change in road surface conditions of the segment based on the road surface condition data accumulated on a segment-by-segment basis and a repair scheduled (Continued)

time-of-day is calculated according to the prediction function to output to an output apparatus.

4 Claims, 9 Drawing Sheets

(51) Int. Cl.
*G06Q 50/30* (2012.01)
*G06Q 50/08* (2012.01)
*G06Q 10/00* (2012.01)
*G08G 1/00* (2006.01)
*G06Q 10/04* (2012.01)
*G06Q 50/02* (2012.01)

(52) U.S. Cl.
CPC ............ *G06Q 50/02* (2013.01); *G06Q 50/08* (2013.01); *G06Q 50/30* (2013.01); *G07C 5/008* (2013.01); *G08G 1/00* (2013.01)

(56) References Cited

U.S. PATENT DOCUMENTS

| | | | |
|---|---|---|---|
| 8,145,513 B2* | 3/2012 | Villalobos | G06Q 10/063 705/7.11 |
| 10,144,380 B2* | 12/2018 | Laskey | B60K 17/165 |
| 10,240,935 B2* | 3/2019 | Breed | G01C 21/34 |
| 10,600,256 B2* | 3/2020 | Ziegler | G07C 5/08 |
| 10,665,040 B2* | 5/2020 | Colvin | G06F 3/061 |
| 2006/0155447 A1* | 7/2006 | Uken | B60W 30/188 701/50 |
| 2007/0078570 A1* | 4/2007 | Dai | G08G 1/096791 701/1 |
| 2008/0082347 A1 | 4/2008 | Villalobos et al. | |
| 2010/0073124 A1* | 3/2010 | Mahalingaiah | G08G 1/20 340/5.1 |
| 2015/0204758 A1* | 7/2015 | Schnell | G01M 15/05 73/114.13 |
| 2016/0258118 A1 | 9/2016 | Jinno et al. | |
| 2021/0117897 A1* | 4/2021 | Williams | G08G 1/087 |

* cited by examiner

| SELF-LOCATION (236b) | TIME-OF-DAY (236c) | ROAD SURFACE CONDITIONS (236d) | SLIP RATIO (236e) |
|---|---|---|---|
| (x1,y1) | t1 | h(t1) | λ(t1) |
| (x2,y2) | t2 | h(t2) | λ(t2) |
| ... | ... | ... | ... |

| VEHICLE ID (237a) | SELF-LOCATION (237b) | TIME-OF-DAY (237c) | ROAD SURFACE CONDITIONS (237d) | SLIP RATIO (237e) |
|---|---|---|---|---|
| truck01 | (x1,y1) | t1 | h(t1) | λ(t1) |

| SELF-LOCATION (336b) | TIME-OF-DAY (336c) | WORK STATUS (336d) | SLIP RATIO (336e) |
|---|---|---|---|
| (x3,y3) | t1 | 1 | λ(t1) |
| (x4,y4) | t2 | 0 | λ(t1¥2) |
| ... | ... | ... | ... |

| VEHICLE ID (337a) | SELF-LOCATION (337b) | TIME-OF-DAY (337c) | WORK STATUS (337d) | SLIP RATIO (337e) |
|---|---|---|---|---|
| grader01 | (x3,y3) | t1 | 1 | λ(t1) |

| SEGMENT | RANGE |
|---|---|
| 1 | (x1,y1)~(x11,y11) |
| 2 | (x2,y2)~(x21,y21) |
|  |  |

432

| SEGMENT NUMBER | VEHICLE ID | SELF-LOCATION | TIME-OF-DAY | ROAD SURFACE CONDITIONS/ WORK STATUS | SLIP RATIO |
|---|---|---|---|---|---|
| 1 | grader01 | (x1,y1) | t1 | 1 | λ1(t1) |
|  |  |  |  |  |  |
|  |  |  |  |  |  |

| SEGMENT NUMBER | VEHICLE ID | SELF-LOCATION | TIME-OF-DAY | ROAD SURFACE CONDITIONS/ WORK STATUS | SLIP RATIO |
|---|---|---|---|---|---|
| 2 | truck01 | (x2,y2) | t1 | h2(t1) | λ2(t1) |
|  |  |  |  |  |  |
|  |  |  |  |  |  |

ROAD SURFACE MANAGEMENT SYSTEM AND ROAD SURFACE MANAGEMENT METHOD

TECHNICAL FIELD

The present invention relates to a technique for managing road surface conditions of a travel route of a haulage vehicle. In particular, the present invention relates to a technique for managing road surface conditions of an unpaved travel route such as in a mine and the like.

BACKGROUND ART

There is a technology to implement the maintenance management of the road surface which is degraded by haulage vehicles repeatedly traveling on unpaved travel routes such as in a mine excavation site or the like. For example, Patent Literature 1 discloses a mine machinery management system "in which a management apparatus gathers operating information about dump trucks via a management wireless communication apparatus. Routes Rg, Rr along which a dump truck travels are identified based on position information on at least four places included in the operating information about a dump truck, the four places being included in a route of the dump truck moving from a dumping site to a loading site where the truck is loaded, and then moving back to the dumping site (excerpts from an abstract)".

CITATION LIST

Patent Literature

PATENT LITERATURE 1: JP-A No. 2013-105278

SUMMARY OF INVENTION

Technical Problem

In the technology disclosed in Patent Literature 1, a roughness of the road surface of the travel route identified by the above technique are sensed by use of the operating information about the dump truck in order to make a road-surface maintenance plan. However, in general, in environment as described above, maintenance vehicles for repairing the travel route, combined with the haulage vehicles, simultaneously travel in order to repair a place where the road surface conditions have been degraded. In the technique disclosed in Patent Literature 1, such repairs done by the maintenance vehicle are never taken into account. Further, factors contributing to the occurrence of the roughness include a time-related, local factor such as traveling of the haulage vehicles and an unexpected, global factor such as rainfall and/or the like. However, in the technique disclosed in Patent Literature 1, a difference between both the factors is never taken into account. For these reasons, the technique disclosed in Patent Literature 1 cannot provide a rational, high-precision plan to perform the road-surface maintenance.

The present invention has been achieved in view of such circumstances, and it is an object thereof to provide a technique for enabling efficient road surface management in environment where haulage vehicles repeatedly travel on unpaved travel routes such as in a mine or the like, in order to contribute to the enhanced efficiency of the road-surface maintenance work.

Solution to Problem

The present invention provides a road surface management system which divides a travel route, along which a haulage vehicle travels, into a plurality of segments, and manages road surface conditions of the travel route on a segment-by-segment basis. The road surface management system includes: a management server that includes an arithmetic apparatus, a storage apparatus, an output apparatus and a communication apparatus; a haulage vehicle onboard terminal that is installed in the haulage vehicle and includes a first arithmetic apparatus and a first communication apparatus; and a repair vehicle onboard terminal that is installed in a repair vehicle for repairing the travel route, and includes a second arithmetic apparatus and a second communication apparatus. The first arithmetic apparatus calculates road surface condition data on the travel route on the basis of a signal input from a sensor installed in the haulage vehicle. The first arithmetic apparatus transmits the road surface condition data thus calculated, combined with haulage vehicle position data which is positional data of the haulage vehicle, to the management server through the first communication apparatus. The second arithmetic apparatus calculates work status data indicating a work status of the repair vehicle, on the basis of a signal input from a sensor installed in the repair vehicle. The second arithmetic apparatus transmits the work status data thus calculated, combined with repair vehicle position data which is positional data of the repair vehicle, to the management server through the second communication apparatus. The arithmetic apparatus is connected to the communication apparatus, the storage apparatus and the output apparatus. Every time the arithmetic apparatus receives the haulage vehicle position data and the road surface condition data through the communication apparatus, the arithmetic apparatus associates the segment including a position specified by the haulage vehicle position data, a reception time-of-day, and the road surface condition data with one another for accumulation in the storage apparatus. Every time the arithmetic apparatus receives the repair vehicle position data and the work status data indicating a working state, through the communication apparatus, the arithmetic apparatus resets the road surface condition data accumulated in the storage device in association with the segment including a position specified by the repair vehicle position data. Every time the road surface condition data is newly accumulated in the storage apparatus, the arithmetic apparatus determines a prediction function to predict a chronological change in road surface conditions of the segment on the basis of a plurality of pieces of the road surface condition data accumulated on a segment-by-segment basis. Then, according to the prediction function thus determined, the arithmetic apparatus calculates a time to reach a road surface repair threshold value as a repair scheduled time-of-day. The arithmetic apparatus outputs the repair scheduled time-of-day thus calculated, to the output apparatus.

Advantageous Effects of Invention

According to the present invention, in the environment where haulage vehicles repeatedly travel on unpaved travel routes such as in a mine or the like, efficient road surface management is enabled to contribute to the enhanced efficiency of the road-surface maintenance work. The above and other problems, configurations and advantageous effects will be more apparent from the following description of an embodiment.

BRIEF DESCRIPTION OF DRAWINGS

FIG. 3B is an explanatory diagram for illustrating an example of haulage vehicle data according to the embodiment.

DESCRIPTION OF EMBODIMENT

An embodiment according to the present invention will now be described with reference to the accompanying drawings. It is noted that, throughout the specification, like reference signs are used to refer to elements/components having like functions unless otherwise specified, and a repetitive description is omitted.

A road surface management system according to the embodiment is mainly used in the environment where haulage vehicles repeatedly travel on unpaved travel routes such as in a mine or the like. The road surface management system according to the embodiment determines a road-surface condition prediction function by use of a set of position information and road surface information about a travel route received from a haulage vehicle, and a set of position information and work information received from a repair vehicle. The prediction function is then used to predict the repair timing which is then notified. At this time, independently of the determination of the prediction function, road surface changes by weather are also taken into consideration. The road surface management system according to the embodiment will be described below with an eye to the functions.

Figure 1:
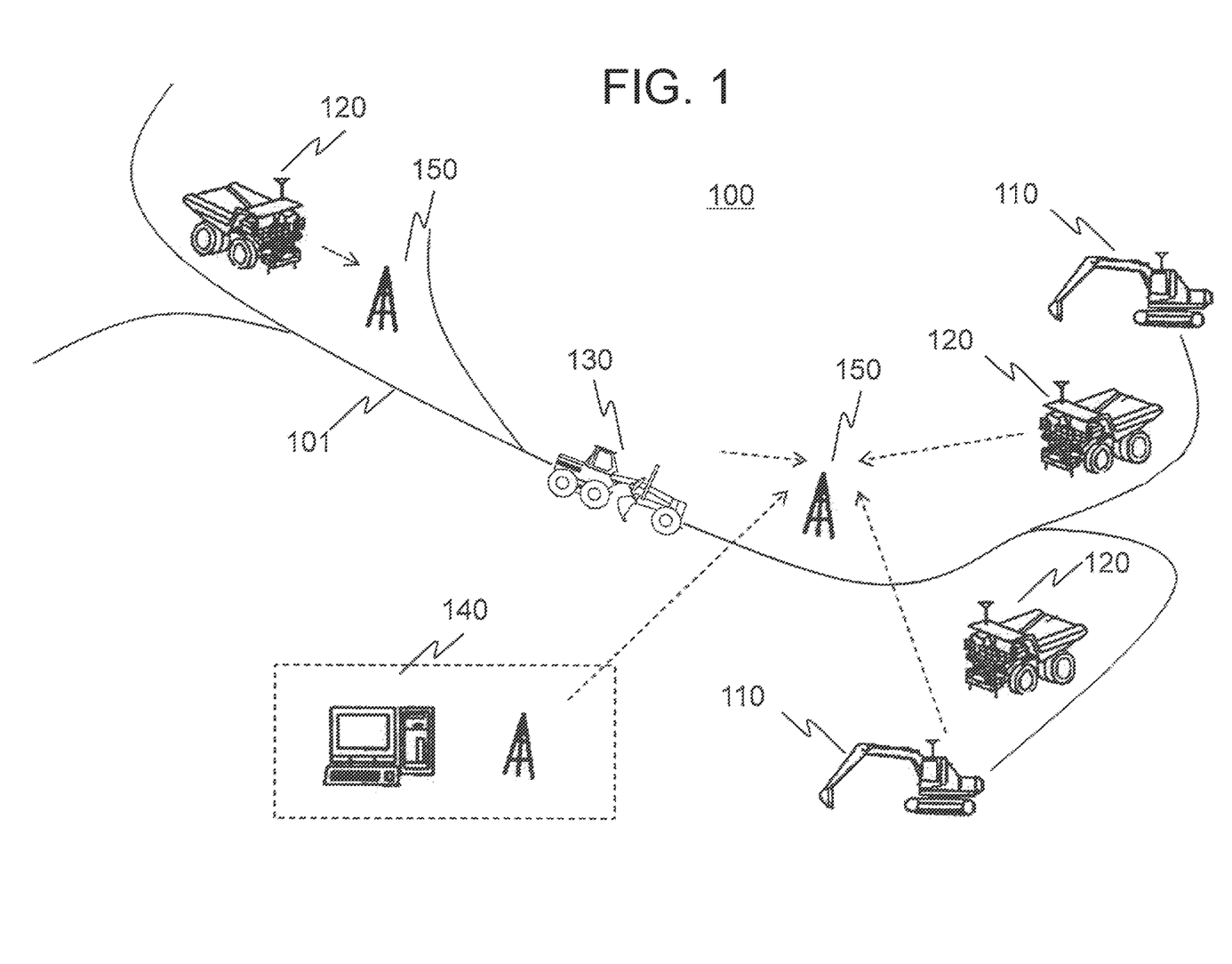
FIG. 1 is an explanatory diagram for illustrating the overall configuration of a road surface management system according to an embodiment of the present invention.

FIG. 1 is a schematic configuration diagram of a road surface management system 100 according to the embodiment. The road surface management system 100 according to the embodiment includes working vehicles 110, haulage vehicles 120, repair vehicles 130, a management server 140 and radio relay stations 150. It is noted that any number of the working vehicles 110, haulage vehicles 120, repair vehicles 130 and radio relay stations 150 may be employed. In the embodiment, also, the road surface management system will be described as being used in a mine, by way of example.

The working vehicle 110 may be, for example, an excavator or the like, which performs the excavation work, loading work and/or the like. The working vehicle 110 is located in a loading site in a mine.

The haulage vehicle 120 may be, for example, a dump truck or the like, which is used for transport of excavated materials, such as crushed stone, soil and sand, etc. excavated by the working vehicle 110, from a loading site to a dumping site. For transport, the haulage vehicle 120 travels on a travel route 101 in the mine. The embodiment will be described below assuming that the haulage vehicle 120 is a dump truck 120. The dump truck 120 includes a haulage vehicle onboard terminal 121 (see FIG. 2B).

The repair vehicle 130 may be, for example, a motor grade, a bulldozer or the like. In a mine, as described above, the travel route 101 is not paved. Because of this, the road surface conditions of the travel route 101 are degraded by repeatedly reciprocating travel of the heavy weight dump truck 120, by rainfall, and/or the like. The repair vehicle 130 is for repairing the road surface of the travel route 101 which has been degraded due to such circumstances. The embodiment will be described below assuming that the repair vehicle 130 is a motor grader 130. The motor grader 130 includes a repair vehicle onboard terminal 131 (see FIG. 4B).

The management server 140 is placed in an administration center in the mine. The management server 140 performs transmission and reception of data between the haulage vehicle onboard terminal 121 and the repair vehicle onboard terminal 131 via the radio relay station 150. In the embodiment, the management server 140 processes the data received from the haulage vehicle onboard terminals 121 and the repair vehicle onboard terminals 131 for management of the road surface of the travel routes 101 in the mine.

Dump Truck

Figure 2A:
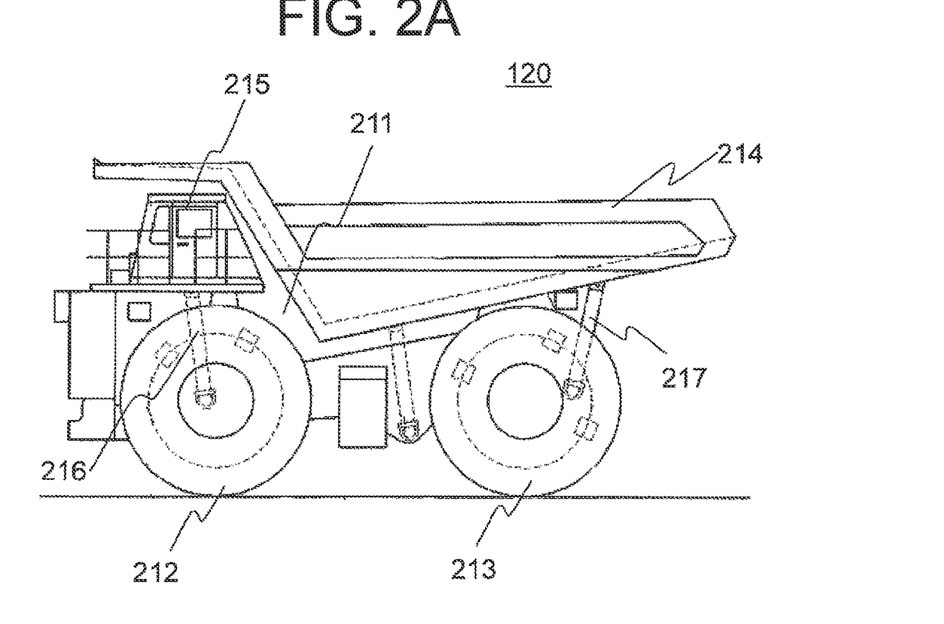
FIG. 2A is a side view of a dump truck of an embodiment according to the present invention.

Initially, the configuration of the dump truck 120 is described. FIG. 2A is a side view of the outer appearance of the dump truck 120, and FIG. 2B is a functional block diagram of the haulage vehicle onboard terminal 121 included in the dump truck 120.

Figure 2B:
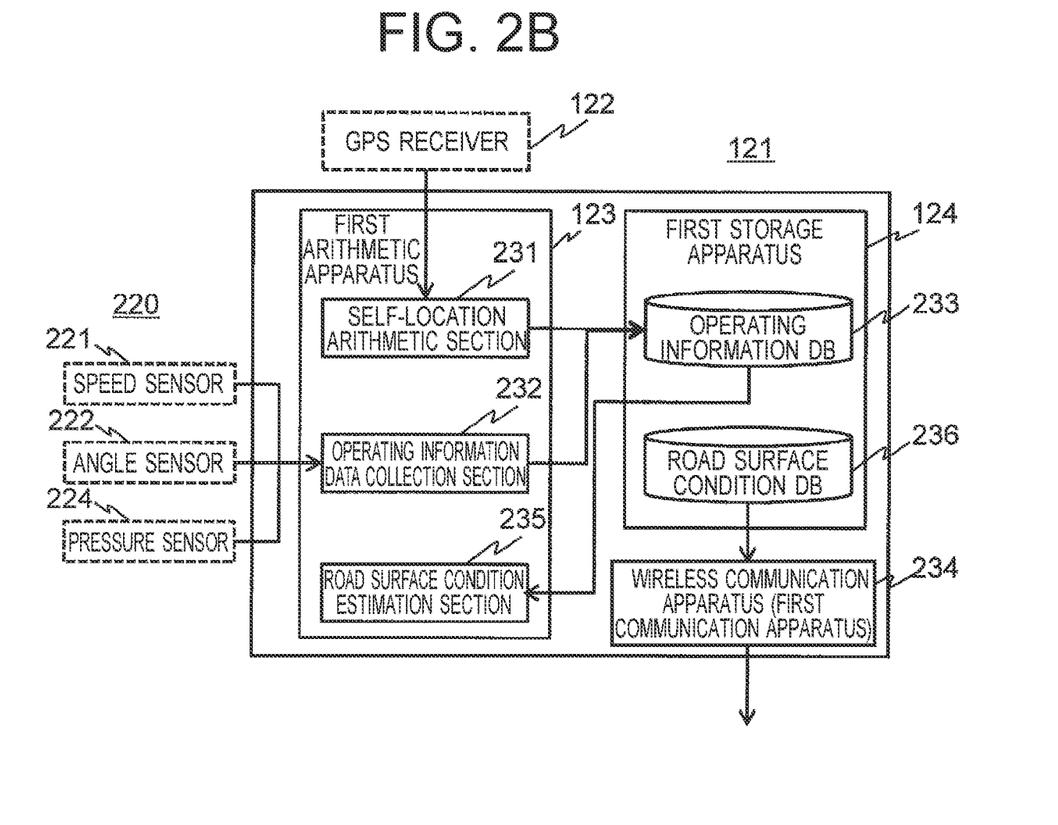
FIG. 2B is a functional block diagram of a haulage vehicle onboard terminal according to an embodiment of the present invention.

As illustrated in FIG. 2, the dump truck 120 includes a vehicle body 211, left and right front wheels 212, left and right rear wheels 213, a load body 214, a cab 215, left and right front-wheel suspensions 216, left and right rear-wheel suspensions 217, and various sensors 220. The haulage vehicle onboard terminal 121 is placed, for example, in the cab 215.

The left and right front-wheel suspensions 216 are installed between the vehicle body 211 and the respective left and right front wheels 212. The left and right rear-wheel suspensions 217 are installed between the vehicle body 211 and the respective left and right rear wheels 213. The four suspensions 216, 217 are, for example, hydraulic cylinders.

In the embodiment, the various sensors 220 include, as illustrated in FIG. 2B, a speed sensor 221, an angle sensor 222 and a pressure sensor 224.

The speed sensor 221 is installed on a shaft of each of the left and right front wheels 212 and the left and right rear wheels 213 to detect a rotational speed of the shaft in an independent manner.

The angle sensor 222 is installed in the vehicle body 211 to detect an inclined angle of the vehicle body 211. For example, a pendulum sensor, MEMS or the like is used for the angle sensor 222.

The pressure sensor 224 is installed in each of the front-wheel suspensions 216 and the rear-wheel suspensions 217, and the pressure sensor 224 is a suspension pressure sensor to detect the pressure in the corresponding hydraulic cylinder. The detected pressure is output as a suspension pressure.

The dump truck 120 in the embodiment further includes a satellite signal receiver 122. The satellite signal receiver 122 receives signals from a plurality of navigation satellites such as e.g. GPS (Global Positioning System) satellites and/or the like. In the embodiment, the satellite signal receiver 122 is hereinafter referred to as a GPS receiver 122. A signal received from the navigation satellite is also referred to as a GPS signal.

Haulage Vehicle Onboard Terminal

As illustrated in FIG. 2B, the haulage vehicle onboard terminal 121 is connected to the various sensors 220 and the GPS receiver 122, and the haulage vehicle onboard terminal 121 processes the data acquired by them before transmitting the data to the management server 140. In addition, in the embodiment, the road surface conditions of the travel route 101 and a slip ratio are calculated, and then transmitted, together with the position information, to the management server 140.

To realize this, the haulage vehicle onboard terminal 121 according to the embodiment includes, as illustrated in FIG. 2B, a self-location arithmetic section 231, an operating information data collection section 232, an operating information database (DB) 233, a wireless communication apparatus (first communication apparatus) 234, a road surface condition estimation section 235, and a road surface condition database (DB) 236.

The self-location arithmetic section 231 is connected to the GPS receiver 122 and the operating information DB 233. The self-location arithmetic section 231 acquires a GPS signal received by the GPS receiver 122, and uses the GPS signal to calculate a self-location. GNSS (Global Navigation Satellite System) is employed herein, which is a positioning scheme using GPS signals. The calculated self-position data, together with a GPS signal reception time-of-day, is stored in the operating information DB 233.

It is noted that an available navigation satellite is not limited to the GPS satellite, and may be, for example, GLONASS, Galileo, a satellite positioning system such as QZSS (Quasi-Zenith Satellite System) or the like, or any combination thereof.

In the embodiment, assuming that a self-location to be estimated is expressed as coordinate values of a predetermined coordinate system. The coordinate system may be, for example, a mine-specific coordinate system, or alternatively, a latitude-longitude coordinate system with coordinate values representing latitude and longitude may be used. A coordinate system used herein is hereinafter referred to simply as an "applicable coordinate system". Also, the GPS signal reception time-of-day is hereinafter referred to as an "acquisition time-of-day".

The operating information data collection section 232 is connected to the operating information DB 233 and the various sensors 220 installed in the respective portions of the dump truck 120. The operating information data collection section 232 collects, as operating information data, sensor signals detected from the respective portions of the dump truck 120 by the sensors 220. In the embodiment, data collected as operating information data includes, for example, speed data for each wheel from the speed sensor 221, angle data from the angle sensor 222 and pressure data for each suspension from the pressure sensor 224 (hereinafter referred to as "suspension pressure data").

Note that in the embodiment it is assumed that each sensor signal and the GPS signal are acquired periodically at almost the same times-of-day. Then, the signal values (data), together with the acquisition times-of-day, are output to the operating information DB 233.

The operating information DB 233 stores the self-location data and the operating information data which are collected by the self-location arithmetic section 231 and the operating information data collection section 232. In the embodiment, the self-location data and the operating information data are stored in association with the acquisition times-of-day, respectively.

The road surface condition estimation section 235 is connected to the operating information DB 233. The road surface condition estimation section 235 uses the operating information data stored in the operating information DB 233 to estimate road surface conditions of the travel route 101. In the embodiment, the road surface condition estimation section 235 calculates a road surface condition quantity (road surface condition data) and a slip ratio as indexes representing the road surface conditions.

In the embodiment, the road surface condition estimation section 235 calculates the road surface condition data by use of the speed data and the suspension pressure data of the dump truck 120. Specifically, the above data acquired at time-of-day t is used to calculate the road surface condition data h(t) on the basis of the following equation (1):

$$h(t) = \alpha A/v \tag{1}$$

where A is a coefficient of variation within a predetermined time period β before and after time-of-day t on the suspension pressure data, that is, from t−β to t+β, v is a speed (m/sec) acquired at time-of-day t, and α is a coefficient.

Further, the road surface condition estimation section 235 calculates a slip ratio by use of the speed data of the dump truck 120 acquired at the speed sensor 221. Specifically, for example, the above data acquired at time-of-day t is used to calculate a slip ratio λ(t) on the basis of the following equation (2):

$$\lambda(t) = |(Vr-V)/\mathrm{Max}\{Vr, V\}| \tag{2}$$

Where Vr is a wheel speed of a drive wheel at time-of-day t, V is a wheel speed of a driven wheel at time-of-day t, Max{ } is a function returning the maximum of the values in { }, and || symbolizes the absolute value of the values in || (e.g. see Japanese Patent No. 5336447). In the embodiment, for example, the speed data from the speed sensor 221 of the rear wheel 213 is used as a wheel speed of a drive wheel and the speed data from the speed sensor 221 of the front wheel 212 is used as a wheel speed of a driven wheel.

It is noted that the calculations of the road surface condition data h(t) and the slip ratio λ(t) are not limited to the above approaches. For example, the road surface condition data h(t) may be calculated by use of a ratio of the suspension pressure data at time-of-day t to the suspension pressure data during travel at a constant speed on a flat road surface (see, e.g., JP-A No. 2013-166425). Alternatively, maximum amplitude and a frequency of the suspension pressure data within a predetermined time period may be determined and the determined values may be used as the road surface condition data h(t) (see, e.g., WO2015/140966).

The road surface condition data h(t) and the slip ratio λ(t), which have been calculated, are stored in the road surface condition DB 236 in association with the acquisition time-of-day t of the operating information data used in the calculation, and with the self-location data acquired at the same time-of-day. It is noted that, if there is no self-location data acquired at the same time-of-day as the operating information data, the road surface condition data h(t) and the slip ratio λ(t) may be stored in association with self-location data acquired at a closest time-of-day.

Figure 3A:
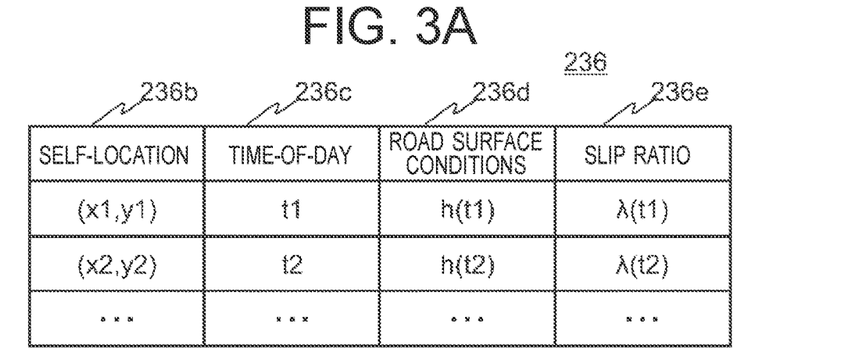
FIG. 3B is an explanatory diagram for illustrating an example of a road surface condition database according to an embodiment of the present invention.
FIG. 3C is an explanatory diagram for illustrating an example of work status data according to the embodiment.
FIG. 3D is an explanatory diagram for illustrating an example of repair vehicle data according to the embodiment.

Here, FIG. 3B shows an example of the road surface condition DB 236. As illustrated in FIG. 3B, the road surface conditions DB 236 includes self-locations 236b, times-of-day 236c, road surface condition data 236d and slip ratios 236e. Further, a vehicle ID uniquely assigned to each dump truck 120 may be included.

The wireless communication apparatus 234 performs transmission/reception of data to/from the management server 140. In the embodiment, the wireless communication apparatus 234 is connected to the road surface condition DB 236, and every time new data is stored in the road surface condition DB 236, the new data is transmitted as haulage vehicle data to the management server 140. It is noted that the haulage vehicle data may be transmitted periodically or in response to a request from the management server 140.

Figure 3B:
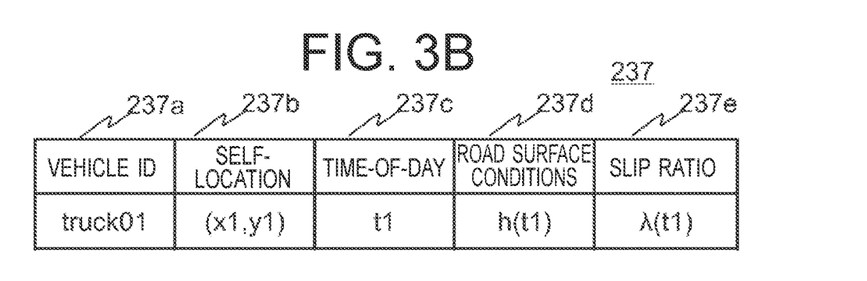

FIG. 3B shows an example of haulage vehicle data 237 transmitted from the dump truck 120 to the management server 140. As illustrated in FIG. 3B, the haulage vehicle data 237 include a vehicle ID 237a, self-location data 237b, a time-of-day 237c, road surface conditions 237d and a slip ratio 237e.

It is noted that the wireless communication apparatus 234 may be also connected to the operating information DB 233, and may output the data stored in the operating information DB 233 to the management server 140 in a periodical manner or in response to a request from the management server 140.

The haulage vehicle onboard terminal 121 according to the embodiment is realized by, for example, a general-purpose information processing apparatus including a first arithmetic apparatus (CPU) 123, memory, a first storage apparatus 124, and a communication interface (wireless communication apparatus 234). The first arithmetic apparatus 123 loads and executes the program pre-stored in the first storage apparatus 124, into the memory in order to implement the self-location arithmetic section 231, the operating information data collection section 232 and the road surface condition estimation section 235. The operating information DB 233 and the road surface condition DB 236 are stored in the first storage apparatus 124.

The haulage vehicle onboard terminal 121 may also include a display and a display control section for displaying process contents.

Motor Grader

Figure 4A:
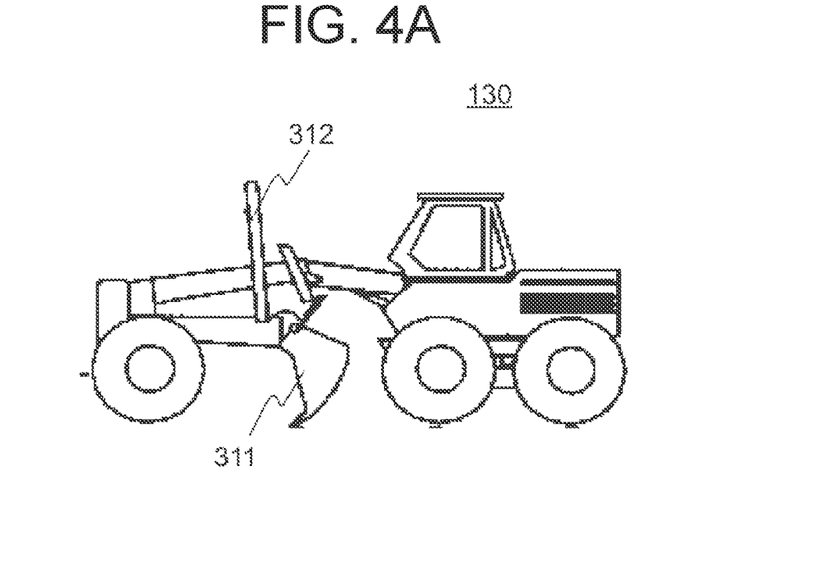
FIG. 4A is a side view of a motor grader of an embodiment according to the present invention.
Figure 4B:
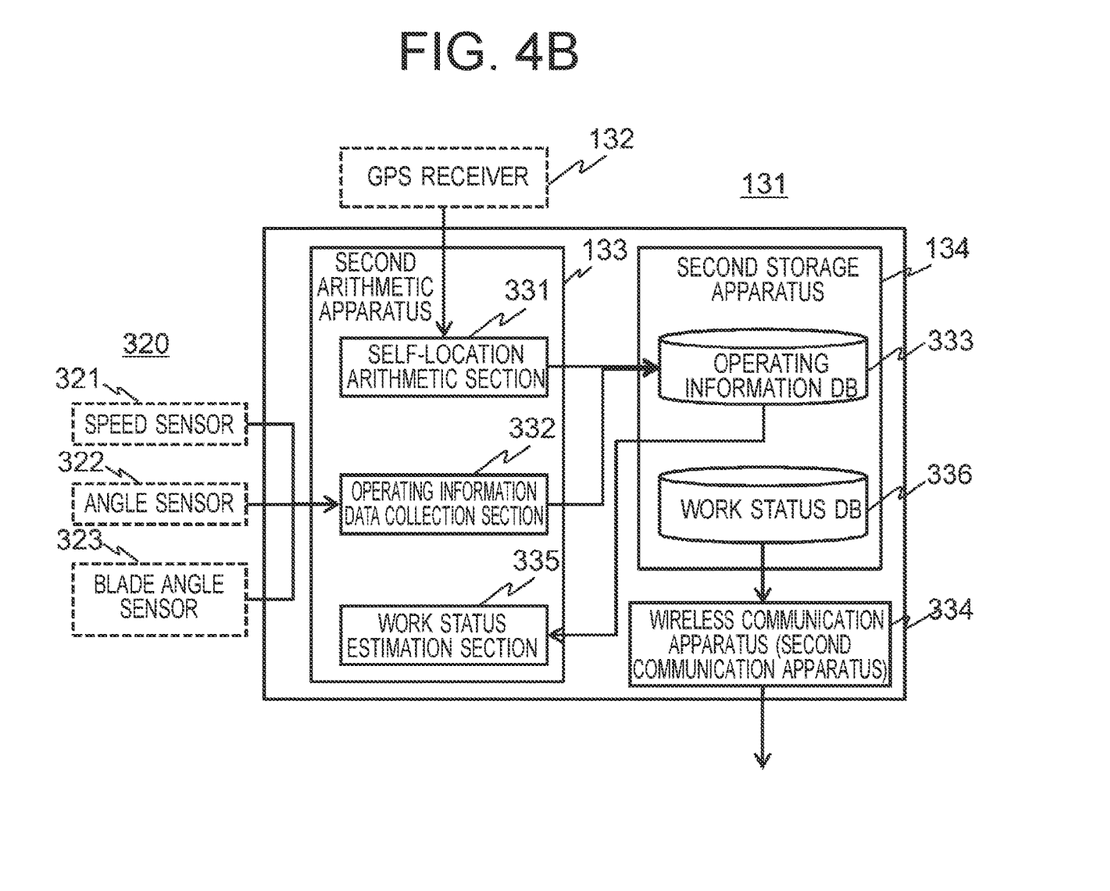
FIG. 4B is a functional block diagram of a repair vehicle onboard terminal according to an embodiment of the present invention.

Next, a motor grader 130 will be described. FIG. 4A is a side view of the outer appearance of the motor grader 130, and FIG. 4B is a functional block diagram of the repair vehicle onboard terminal 131 included in the motor grader 130.

The motor grader 130 according to the embodiment includes a blade 311 and the blade actuator 312 to drive the blade. The motor grader 130 also includes, as sensors 320, a speed sensor 321, an angle sensor 322 and a blade angle sensor 323, as illustrated in FIG. 4B. Similarly to the dump truck 120, the motor grader 130 also includes a satellite signal receiver (GPS receiver) 132 to receive signals from navigation satellites. Further, the repair vehicle onboard terminal 131 is placed, for example, in a cab.

Repair Vehicle Onboard Terminal

As illustrated in FIG. 3B, the repair vehicle onboard terminal 131 is connected to the sensors 320 and the GPS receiver 122, and processes data acquired by them before transmitting the data to the management server 140. In the embodiment, the repair vehicle onboard terminal 131 further detects whether or not the motor grader 130 has performed repair work, and then transmits the detection result (work status data) and self-location data to the management server 140.

To realize this, the repair vehicle onboard terminal 131 according to the embodiment includes, as illustrated in FIG. 4B, a self-location arithmetic section 331, an operating information data collection section 332, an operating information database (DB) 333, a wireless communication apparatus (second communication apparatus) 334, a work status estimation section 335, and a work status database (DB) 336.

The self-location arithmetic section 331, operating information data collection section 332, operating information DB 333, and wireless communication apparatus 334 are basically identical in function with the identically named sections of the haulage vehicle onboard terminal 121, and therefore, here, details of them are omitted. However, the wireless communication apparatus 334 is connected to the work status DB 336, and transmits later-described repair vehicle data to the management server 140.

The work status estimation section 335 acquires information about whether or not the motor grader 130 is during execution of work. In the embodiment, the work status estimation section 335 is connected to the operating information DB 333, and determines whether or not it is a working state, on the basis of sensor signals (operating information data) acquired and stored from the angle sensor 322 and the blade angle sensor 323.

The work status estimation section 335 uses, for example, such operating information data to calculate, as a three-dimensional position, a height level of a leading end of a bottom side of the blade 311. If the calculation result becomes equal to or less than a predetermined height threshold valve, the working state is determined. The determination result is stored as work status data in the work status DB 336 in association with the acquisition time-of-day of the operating information data used in the calculation, and with the self-location data acquired at the same time-of-day, as in the case of the above-described road surface condition data.

The work status estimation section 335 according to the embodiment also calculates a slip ratio by use of the speed data acquired at the speed sensor 221, as in the case of the road surface condition estimation section 235 of the dump truck 120.

Figure 3C:
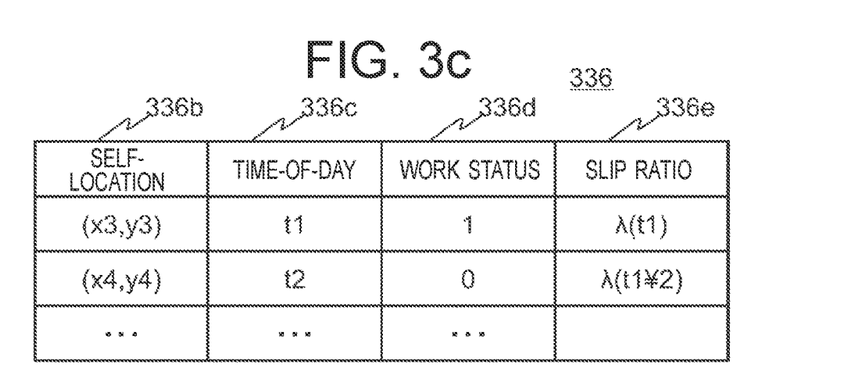

Here, FIG. 3C shows an example of the work status DB 336. As illustrated in FIG. 3C, the work status DB 336 includes self-locations 336b, times-of-day 336c, work status data 336d and slip ratios 336e. Further, a vehicle ID uniquely assigned to each motor grader 130 may be included. It is noted that, by way of illustration only, the work status data 336d is illustrated as 1 being stored in the case of determining that it is the working state, and 0 being stored in other cases.

Figure 3D:
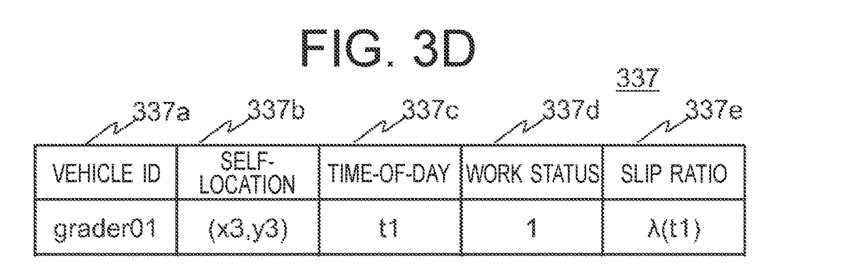

Also, FIG. 3D shows an example of repair vehicle data 337 transmitted from the motor grader 130 in the embodiment to the management server 140. As illustrated in FIG. 3D, the repair vehicle data 337 include a vehicle ID 337a, self-location 337b, a time-of-day 337c, work status data 337d and a slip ratio 337e.

Similarly to the haulage vehicle onboard terminal 121, the repair vehicle onboard terminal 131 is realized by a general-purpose information processing apparatus including a second arithmetic apparatus (CPU) 133, memory, a second storage apparatus 134, and a communication interface (wireless communication apparatus 334). The second arithmetic apparatus 133 loads and executes the program pre-stored in the second storage apparatus 134, into the memory in order to implement the self-location arithmetic section 331, operating information data collection section 332 and work status estimation section 335. The operating information DB 333 and work status DB 336 are stored in the second storage apparatus 134.

The repair vehicle onboard terminal 131 may also include a display and a display control section for displaying process contents.

Both of the dump truck 120 and the motor grader 130 will be hereinafter referred to simply as "vehicles" unless distinction between them is necessary. Also both of the haulage vehicle data 237 and the repair vehicle data 337 will also be referred to simply as "vehicle data" unless distinction between them is necessary.

Management Server

Figure 5:
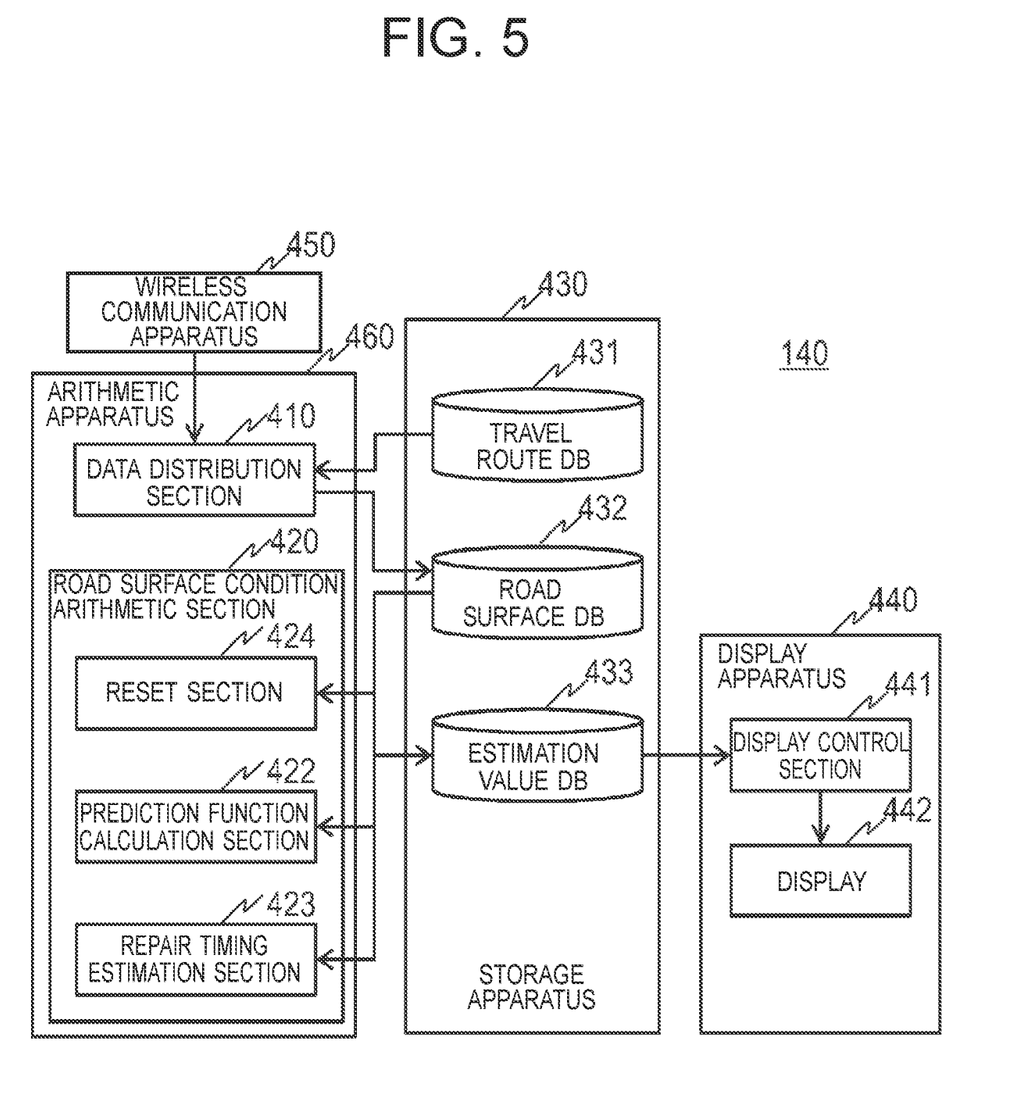
FIG. 5 is a functional block diagram of a management server according to an embodiment of the present invention.

Next, the management server 40 will be described. FIG. 5 is a functional block diagram of the management server 140 according to the embodiment.

In the embodiment, the management server 140 uses the haulage vehicle data transmitted from each of the dump trucks 120 and each of the motor graders 130, to calculate a prediction function that can provide a grasp of an appearance of changes in road surface conditions, and then presents the result to an administrator. Further, the management server 140 uses the prediction function to calculate the subsequent repair scheduled time-of-day, and then presents the result to the administrator. It is noted that the travel route 101 is divided into a plurality of regions (segments) and the prediction function and the repair scheduled time-of-day are calculated for each segment.

To realize this, the management server 140 according to the embodiment includes a wireless communication apparatus 450, a data distribution section 410, a road surface condition arithmetic section 420, a storage apparatus 430 and a display apparatus 440.

The road surface condition arithmetic section 420 estimates a current value of the road surface conditions, a mean value, a degradation rate and the like for each segment. For this purpose, the road surface condition arithmetic section 420 includes a prediction function calculation section 422, a repair timing estimation section 423, and a reset section 424. Also, the storage apparatus 430 stores a travel route DB 431, a road surface DB 432 and an estimation value DB 433. The display apparatus 440 includes a display control section 441 and a display 442.

The wireless communication apparatus 450 is a communication interface receiving via the radio relay stations 150 vehicle data which is transmitted from the dump trucks 120 and the motor graders 130. In the embodiment, the received vehicle data is output to the data distribution section 410.

Figure 6A:
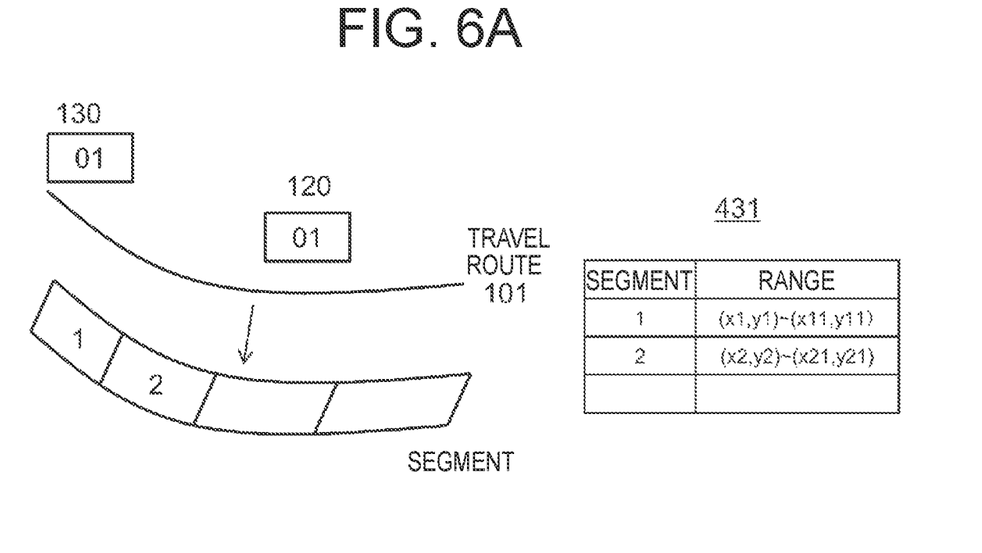
FIG. 6A is an explanatory diagram for illustrating an example of a road route database according to an embodiment of the present invention.

The travel route DB 431 stores the position data on the travel routes 101 in the entire mine on a segment-by-segment basis. For example, as illustrated in FIG. 6A, a range specified with coordinate values of the applicable coordinate system is stored on a segment-by-segment basis. It is noted that the position data on the travel route 101 for each segment may be decided, for example, based on data transmitted from a dump truck 120 while the dump truck 120 travels forward and backward along the travel route 101 over several times.

Figure 6B:
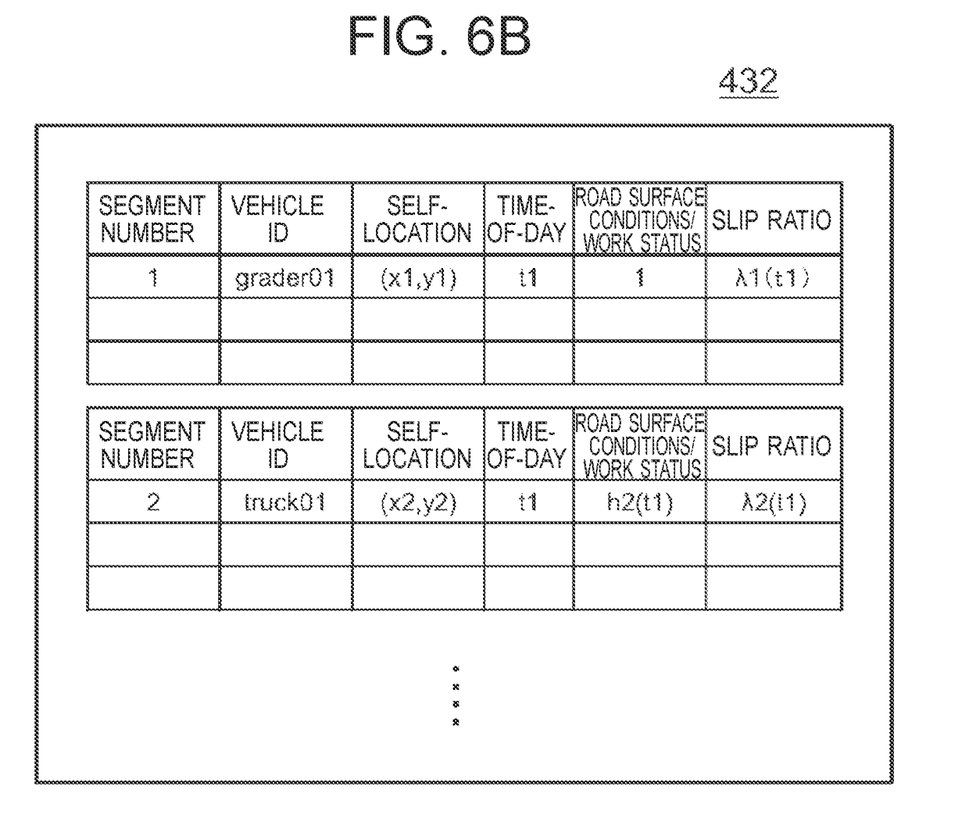
FIG. 6B is an explanatory diagram for illustrating an example of road surface database according to the embodiment.

As illustrated in FIG. 6B, the road surface DB 432 stores the vehicle data received from each vehicle on a segment-by-segment basis. A storage area is provided on a segment-by-segment basis. The storage areas of each database provided on a segment-by-segment basis will be hereinafter referred to as "segment storage areas".

The estimation value DB 433 stores an estimation value calculated for each segment by the road surface condition arithmetic section 420. As described later, the estimation values are, for example, a current value of the road surface conditions in each segment, a mean value, a degradation rate, and the like.

The data distribution section 410 is connected to the wireless communication apparatus 450 and the travel route DB 431. The vehicle data on each vehicle received via the wireless communication apparatus 450 is stored in the road surface DB 432 on a segment-by-segment basis in which the sender vehicle is located. It is determined, based on the self-location data in the vehicle data, which segment the sender vehicle is located in.

The prediction function calculation section 422 is connected to the road surface DB 432 and the estimation value DB 433. And, the prediction function calculation section 422 calculates a prediction function on the basis of the road surface condition data accumulated in the road surface DB 432. The prediction function is calculated for each segment.

Figure 7:
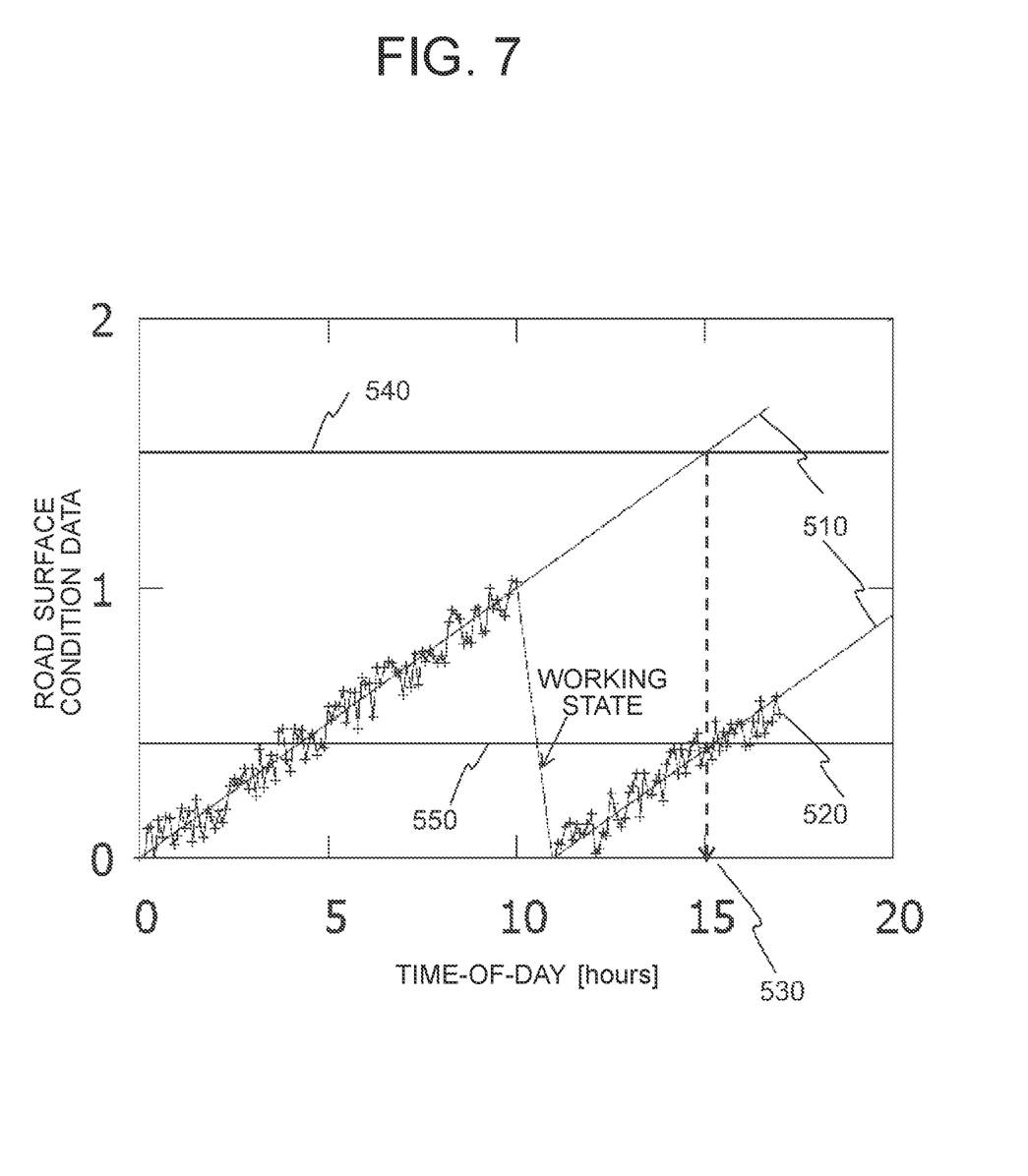
FIG. 7 is an explanatory diagram for illustrating prediction function calculation processing and a display image according to an embodiment of the present invention.

Specifically, for example, the prediction function calculation section 422 plots the road surface data accumulated in a specific-segment area of the road surface date DB 432, as illustrated in FIG. 7. The horizon axis of the graph in FIG. 7 represents times-of-day [hours], and the vertical axis represents the road surface condition data.

Then, the prediction function calculation section 422 performs fitting on the plot result by, for example, the method of least squares or the like in order to decide an approximate function as a prediction function 510. Then, a coefficient of the decided prediction function 510 is stored as an estimation value in a storage area provided in the estimation value DB 433 for a segment of interest for processing.

For example, in the example of FIG. 7, the prediction function calculation section 422 approximates the plot result by a linear function. A coefficient stored as an estimation value is the slope of the function. In this case, the slope expresses a degradation rate.

It is noted that the prediction function calculation section 422 stores a latest value of the road surface condition data entered into the road surface DB 432 in the estimation value DB 433, as a current value 520 of the road surface conditions. Further, a mean value 550 of the latest multiple pieces of road surface condition data, or, a weighted mean value may be entered as a current value of the road surface situation.

The prediction function calculation section 422 may also store all the road surface condition data used in the prediction function calculation in the estimation value DB 433, in association with times-of-day.

The repair timing estimation section 423 is connected to the estimation value DB 433. The prediction function 510 calculated by the prediction function calculation section 422 is used to estimate a repair scheduled time-of-day 530 as repair timing for each segment. For estimating the repair scheduled time-of-day, for example, a road surface repair threshold value 540 is previously determined and the prediction function is extrapolated in order to estimate a time-of-day at which a value of the road surface condition data exceeds the road surface repair threshold value. The repair scheduled time-of-day thus calculated is stored in the estimation value DB 433.

The reset section 424 is connected to the road surface DB 432 and the estimation value DB 433, and resets (discards) the accumulated data. In the embodiment, upon the work status data (working state data) indicating that work is executed is entered in the road surface DB 432, the reset section 424 resets all the road surface condition data accumulated up to this point of time in the segment area. Also, the reset section 424 stores zero as a current value in association with the acquisition time-of-day of the working state data in the estimation value DB 433.

As a result, zero as the road surface condition data is stored in the estimation value DB 433. Also, because there is no accumulated data in the road surface DB 432, the prediction function calculation section 422 calculates a prediction function 510 by use of only another road surface condition data accumulated subsequently to that, as illustrated in FIG. 7. This is because, if the working state data is entered, the pertinent segment of the travel route 101 is considered to be levelled by the repair work executed by the motor grader 130, and therefore the road surface conditions are considered to result in initial conditions.

Further, if number of data with a slip ratio $\lambda(t)$ not less than the threshold value stored in the road surface DB 432 simultaneously are a predetermined threshold value or more, the reset section 424 resets the road surface condition data in all the segment areas. Vehicle data with a slip ratio $\lambda(t)$ not less than the threshold value is output from a plurality of vehicles. This is considered because the road surface conditions of the travel route 101 have been significantly changed by external factors such as rainfall and/or the like.

The display control section 441 is connected to the estimation value DB 433. The display control section 441 uses the estimation values stored in the estimation value DB 433 to generate display data to be displayed on the display 442, and then causes the display 442 to display the display data. The display data includes, for example, the road surface condition data illustrated in FIG. 7, prediction function 510, current value 520, mean value 550, and repair scheduled time-of-day 530.

It is noted that the management server 140 may be configured to include further a sound output section to provide a sound notification of the repair scheduled time-of-day 530.

The management server 140 according to the embodiment is realized by, for example, an information processing apparatus including a CPU (arithmetic apparatus) 460, memory, a storage apparatus 430, a communication interface (wireless communication apparatus 450), and an output apparatus (display apparatus 440). The arithmetic apparatus 460 loads and executes the program pre-stored in the storage apparatus 430, into the memory in order to implement the data distribution section 410, road surface condition arithmetic section 420 and display control section 441. The travel route DB 431, road surface DB 432, and estimation value DB 433 are stored in the storage apparatus 430.

Figure 8:
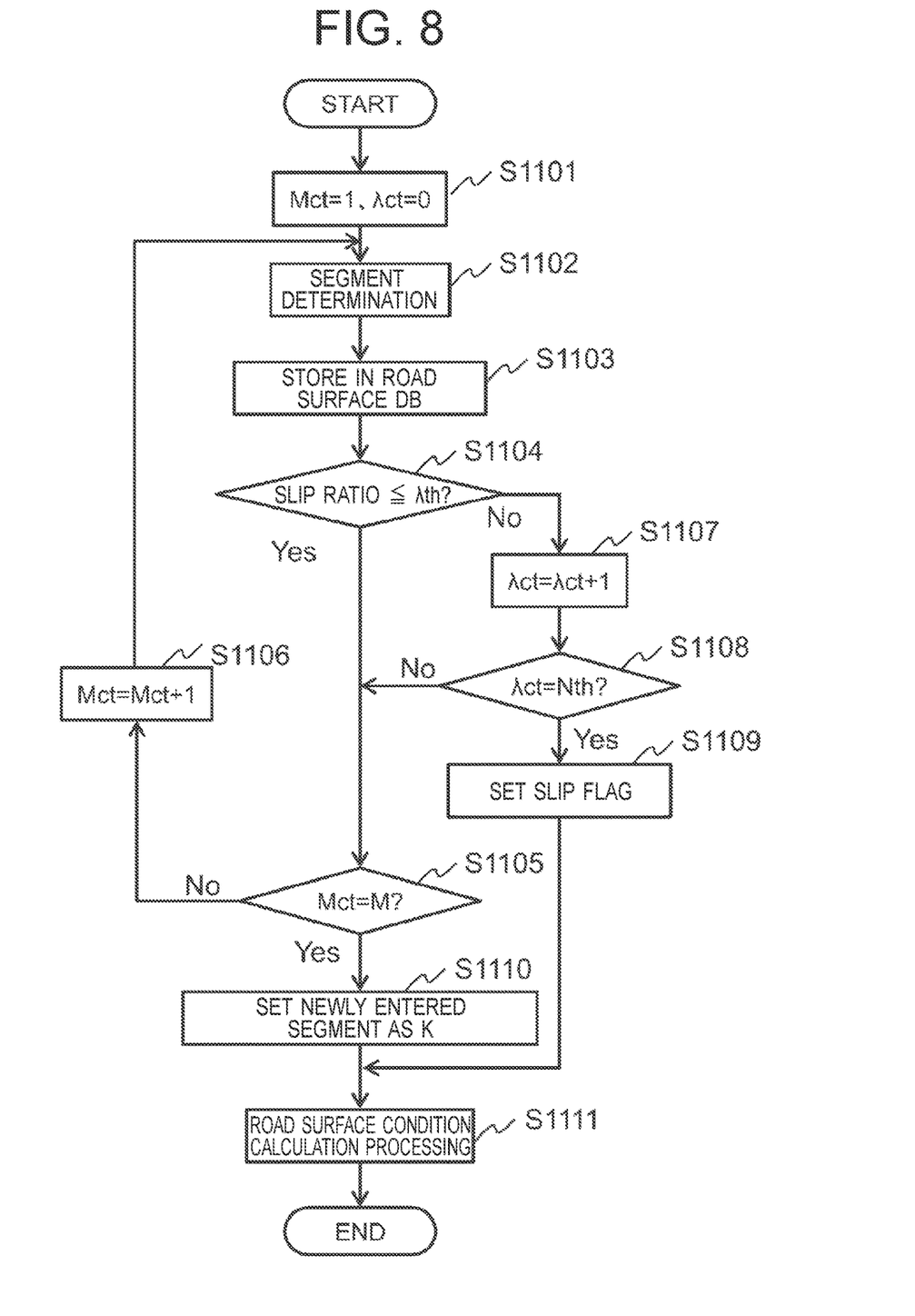
FIG. 8 is a flowchart of road surface management processing according to an embodiment of the present invention.

The flow of the road surface management processing by the management server 140 according to the embodiment will be described below. FIG. 8 is a processing flow of the road surface management processing according to the embodiment. In the following, assuming that vehicle data is received at substantially the same time-of-day from M vehicles (M is an integer not less than one).

The data distribution section 410 initializes a data number counter Mct and a slip ration counter $\lambda$ct (step S1101). Assuming herein that Mct=1, $\lambda$ct=1.

The data distribution section 410 then compares the self-location data and the coordinates in the travel route DB 431 to determine a segment in which a sender vehicle pertinent to the vehicle data of interest for processing is located (step S1102), and stores the road surface condition data of the pertinent segment number in a corresponding segment area of the road surface DB 432 (step S1103).

Subsequently, the reset section 424 determines whether or not the slip ratio in the vehicle data entered into the road surface DB 432 is equal to or less than the slip ratio threshold value $\lambda$th (step S1104).

If the slip ratio is equal to or less than the slip ratio threshold value $\lambda$th (S1104; Yes), the flow returns to step S1102 to process the subsequent vehicle data (steps S1105, 1106).

Then, upon the data distribution section 410 completing the processing for the M vehicles, the road surface condition arithmetic section 420 counts the number of segments newly entered, exclusive of overlaps, and the resulting count is defined as K (K is an integer not less than one) (step S1110). Then, the road surface condition arithmetic section 420 performs the road surface condition arithmetic processing (step S1111), and then the processing is terminated.

Meanwhile, if the slip ratio exceeds the slip ratio threshold value $\lambda$th (S1104; No), the reset section 424 increments the slip ratio counter $\lambda$ct by one (step S1107). Then, it is determined whether or not, within the vehicle data received at the same time-of-day, the number of vehicles with a slip ratio exceeding the slip ratio threshold value $\lambda$th (high slip ratio vehicles) exceeds a predefined vehicles threshold value Nth. In this case, it is determined whether or not $\lambda$ct=a vehicles threshold value Nth (step S1108).

In the embodiment, if the slip ratios of a predetermined number of vehicles exceed the slip ratio threshold value, it is determined that it rains and the road surface conditions will be significantly changed. Because of this, the vehicles threshold value Nth is set to a value suitable for such determination. For example, the vehicles threshold value Nth is set to 40% or half of the total number of vehicles, or the like.

If the number of high slip ratio vehicles is below the vehicles threshold value Nth (S1108; No), the flow moves to step S1105 to continue the processing.

It is noted that, in step S1108, if the number of high slip ratio vehicles reaches the vehicles threshold value Nth (Yes), the reset section 424 sets a slip flag (step S1109), and then the flow moves to S1111.

Figure 9:
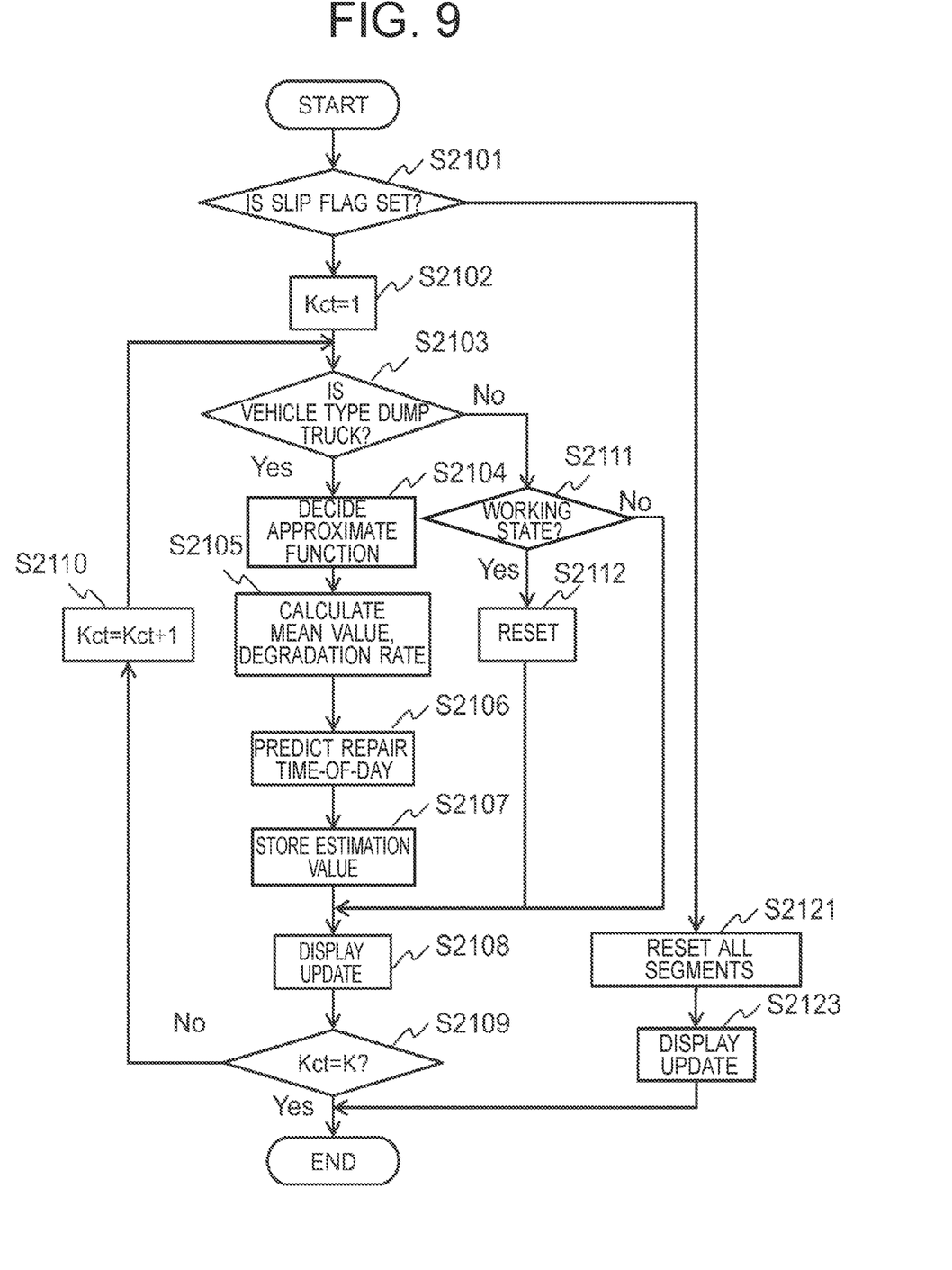
FIG. 9 is a flowchart of road surface condition arithmetic processing according to an embodiment of the present invention.

The flow of road surface condition arithmetic processing performed at the above-described step S1111 by the road surface condition arithmetic section 420 will now be described. FIG. 9 is a processing flow of the road surface condition arithmetic processing according to the embodiment. In this process, the road surface condition arithmetic processing is performed on only the segment pertinent to new data entered into the road surface DB 432. Here, the number of segments pertinent to the newly entered data is K.

Initially, the road surface condition arithmetic section 420 determines whether or not the slip flag is set (step S1201).

If no slip flag is set, the following processing is repeatedly performed on all the segments (K segments) pertinent to the new data entered into the road surface DB 432. For this purpose, first, the segment counter Kct is initialized (Kct=1) (step S2102).

First, the road surface condition arithmetic section 420 determines whether or not a sender of the vehicle data newly entered is a dump truck 120 (step S2103). The determination is made by using a vehicle ID in the vehicle data.

If the sender is dump truck 120, the prediction function calculation section 422 decides a prediction function by use of the entire vehicle data accumulated in the pertinent segment area of the road surface data DB 432 (step S2104).

The prediction function calculation section 422 obtains a coefficient of the calculated prediction function as a degradation rate. Also, the entire vehicle data accumulated in the pertinent segment area is used to calculate a mean value (step S2105). For example, where the prediction function is a linear function, the slope is used for the degradation rate.

Then, the prediction function calculation section 422 extrapolates the prediction function to estimate a repair scheduled time-of-day (step S2106).

Then, the prediction function calculation section 422 stores estimation values of the calculated mean value, degradation rate, repair scheduled time-of-day and the like, in the estimation value DB 433 (step S2107).

Then, the display control section 441 uses the data stored in the estimation value DB 433 to generate display image data, and then causes the display 442 to display it to perform an update of display on the display 442 (step S2108).

Meanwhile, in step S2103, if it is determined that the sender is a motor grader 130, the reset section 424 determines whether or not the working state has been entered as work status data (step S2111). In the case of the no-working state, the flow moves directly to step S2108.

Meanwhile, where in step S2111 the working state has been entered, the reset section 424 performs the reset processing to reset the entire road surface condition data on the segment currently processed (step S2112), and stores zero as the road surface condition data in the estimation value DB 433, and then the flow moves to step S2108.

The road surface condition arithmetic section 420 repeatedly performs the above-described processing on all the segments pertinent to the newly entered data (steps S2109, S2110), and the processing is terminated.

Meanwhile, where in step S2101 the slip flag is set (Yes), the reset section 424 performs the reset processing to reset the road surface condition data on all the segments in the road surface DB 432 (step S2121). At this time, the reset section 424 stores zero as the road surface condition data in each segment of the estimation value DB 433.

Then, the display control section 441 generates display image data for all the segments by use of the data stored in the estimation value DB 433 after reset processing, and then causes the display 442 to display it to perform an update of display on the display 442 (step S2123), and then the processing is terminated.

As described above, according to the embodiment, the haulage vehicle onboard terminals 121, the repair vehicle onboard terminals 131 and the management server 140 are included. The haulage vehicle onboard terminal 121 is installed in a dump truck 120 and periodically transmits: self-location data indicating a location of the dump truck 120; road surface condition data on the travel route 101 of the dump truck 120; and a slip ratio of the dump truck 120. The repair vehicle onboard terminal 131 is installed in a motor grader 130 and periodically transmits: self-location data indicating a location of the motor grader 130; work status data; and a slip ratio of the motor grader 130. And, the management server 140 divides the travel route 101 along which the dump truck 120 travels, into a plurality of segments, and manages the road surface conditions of the travel route 101 on a segment-by-segment basis.

At this time, every time the self-location data and the road surface condition data are received from the dump truck 120, the management server 140 associates a segment including the location specified by the self-location data, a reception time-of-day, and the road surface condition data with one another, and then accumulates them in the road surface DB 432. Also, every time the self-location data and the work status data indicating "the working state" are received from the motor grader 130, the management server 140 resets all the pieces of the road surface condition data concerning the segment which includes a location specified by this self-location data, the road surface condition data being accumulated in the road surface DB 432. Then, every time new road surface condition data is accumulated in the road surface DB 432, the management server 140 determines, based on a plurality of pieces of the road surface condition data accumulated on a segment-by-segment basis, a prediction function to predict a chronological change in the road surface conditions of the segment. Then, the management server 140 calculates, according to the determined prediction function, a time to reach the road surface repair threshold value as a repair scheduled time-of-day. Then, the management server 140 outputs the calculation result to the output apparatus.

In this manner, according to the embodiment, a prediction function to predict a change in road surface conditions is determined by taking into account not only the road surface condition data transmitted from the haulage vehicle such as the dump truck 120, but also the work status data transmitted from the repair vehicle such as the motor grader 130.

Specifically, where data indicating repair work is transmitted from the motor grader 130, only a region of the travel route 101 in which the sender motor grader 130 is located is determined as a leveled region after maintenance, and therefore the prediction function is reset.

And, for only the other places, repair times are predicted based on the determined prediction function. This enables high-accurate prediction in line with more actual circumstances. Then, the administrator can make a repair plan based on the high-accurate prediction. As a result, a strategic, high-accurate road-surface maintenance plan can be made, and therefore efficient road surface management can be implemented.

Further, according to the embodiment, a slip ratio is received from each vehicle and also variability of the slip ratio data is monitored. Then, at the same time of day, if the slip ratios from a predefined number or greater predefined number of vehicles exceed a predetermined value, the prediction function is reset. This is because higher slip ratios of the predetermined number or greater predetermined number of vehicles at the same time-of-day mean that it rains. And, in this case, the prediction functions for throughout the mine are reset. Thus, according to the embodiment, the changed conditions of the road surface are determined by taking into account not only the road surface condition data, but also the slip ratios. Because of this, even when the road surface conditions are significantly changed by a change in weather, for example, rainfall and/or the like, appropriate measures can be taken.

It is noted that, in the embodiment, all of the road surface condition data, the slip ratio and the work status data are calculated on the vehicle and then are transmitted to the management server 140. However, the self-location data, acquisition time and operating information data may be transmitted from the vehicle to the management server 140 and then the management server 140 may use these data for calculations.

Further, in the embodiment, the repair prediction time is displayed on the display 442 to provide notification to the administrator. However, the manner of providing notification to the administrator is not limited to this. For example, a sound notification or the like may be configured to be provided.

It should be understood that the present invention is not limited to the above embodiment and the present invention encompasses various modifications. For example, the above embodiment have been described in detail in order to provide a thorough understanding of the present invention, and the present invention is not necessarily limited to including all the configurations described above.

REFERENCE SIGNS LIST

100 . . . Road surface management system
101 . . . Travel route
110 . . . Working vehicle
120 . . . Dump truck (haulage vehicle)
121 . . . Haulage vehicle onboard terminal
122 . . . GPS receiver (satellite signal receiver)
123 . . . First arithmetic apparatus
124 . . . First storage apparatus
130 . . . Motor grader (repair vehicle)
131 . . . Repair vehicle onboard terminal
133 . . . Second arithmetic apparatus
134 . . . Second storage apparatus
140 . . . Management server
150 . . . Radio relay station
211 . . . Vehicle body
212 . . . Front wheel
213 . . . Rear wheel
214 . . . Load body
215 . . . Cab
216 . . . Front wheel suspension
217 . . . Rear wheel suspension
220 . . . Sensors
221 . . . Speed sensor
222 . . . Angle sensor
224 . . . Pressure sensor
231 . . . Self-location arithmetic section
232 . . . Operating information data collection section
233 . . . Operating information DB
234 . . . Wireless communication apparatus (first communication apparatus)
235 . . . Road surface condition estimation section
236 . . . Road surface condition DB
236b . . . Self-location
236c . . . Time of day
236d . . . Road surface condition data
236e . . . Slip ratio
237 . . . Haulage vehicle data
237a . . . Vehicle ID
237c . . . Time of day
237b . . . Self-location data
237d . . . Road surface condition
237e . . . Slip ratio
311 . . . Blade
312 . . . Blade actuator
320 . . . Sensors
321 . . . Speed sensor
322 . . . Angle sensor
323 . . . Blade angle sensor
331 . . . Self-location arithmetic section
332 . . . Operating information data collection section
333 . . . Operating information DB
334 . . . Wireless communication apparatus (second communication apparatus)
335 . . . Work status estimation section
336 . . . Work status DB
336b . . . Self-location
336c . . . Time of day
336d . . . Work status data
336e . . . Slip ratio
337 . . . Repair vehicle data
337a . . . Vehicle ID
337c . . . Time of day
337b . . . Self-location data
337d . . . Work status data
337e . . . Slip ratio
410 . . . Data distribution section
420 . . . Road surface condition arithmetic section
422 . . . Prediction function calculation section
423 . . . Repair timing estimation section
424 . . . Reset section
430 . . . Storage apparatus
431 . . . Travel route DB
432 . . . Road surface DB
433 . . . Estimation value DB
440 . . . Display apparatus
441 . . . Display control section
442 . . . Display
450 . . . Wireless communication apparatus
460 . . . Arithmetic apparatus
510 . . . Prediction function
520 . . . Current value
530 . . . Repair scheduled time-of-day
540 . . . Road surface repair threshold value
550 . . . Mean value
h . . . Road surface data
λ . . . Slip ratio

The invention claimed is:

1. A road surface management system which divides a travel route, along which a haulage vehicle travels, into a plurality of segments, and manages road surface conditions of the travel route on a segment-by-segment basis, the road surface management system comprising:

a management server that includes an arithmetic apparatus, a storage apparatus, an output apparatus and a communication apparatus;

a haulage vehicle onboard terminal that is installed in the haulage vehicle and includes a first arithmetic apparatus and a first communication apparatus; and a repair vehicle onboard terminal that is installed in a repair vehicle for repairing the travel route, and includes a second arithmetic apparatus and a second communication apparatus, wherein the first arithmetic apparatus calculates road surface condition data on the travel route on the basis of a signal input from a sensor installed in the haulage vehicle, and then the first arithmetic apparatus transmits the road surface condition data thus calculated, combined with haulage vehicle position data which is positional data of the haulage vehicle, to the management server through the first communication apparatus, the second arithmetic apparatus calculates work status data indicating a work status of the repair vehicle, on the basis of a signal input from a sensor installed in the repair vehicle, and then the second arithmetic apparatus transmits the work status data thus calculated, combined with repair vehicle position data which is positional data of the repair vehicle, to the management server through the second communication apparatus, the arithmetic apparatus is connected to the communication apparatus, the storage apparatus and the output apparatus, every time the arithmetic apparatus receives the haulage vehicle position data and the road surface condition data through the communication apparatus, the arithmetic apparatus associates the segment including a position specified by the haulage vehicle position data, a reception time-of-day, and the road surface condition data with one another for accumulation in the storage apparatus, every time the arithmetic apparatus receives the repair vehicle position data and the work status data indicating a working state, through the communication apparatus, the arithmetic apparatus resets the road surface condition data accumulated in the storage device in association with the segment including a position specified by the repair vehicle position data, every time the road surface condition data is newly accumulated in the storage apparatus, the arithmetic apparatus determines a prediction function to predict a chronological change in road surface conditions of the segment on the basis of a plurality of pieces of the road surface condition data accumulated on a segment-by-segment basis, and then, according to the prediction function thus determined, the arithmetic apparatus calculates a time to reach a road surface repair threshold value as a repair scheduled time-of-day, and the arithmetic apparatus outputs the repair scheduled time-of-day thus calculated, to the output apparatus.

2. The road surface management system according to claim 1, wherein the sensor installed in the haulage vehicle includes:

a speed sensor to detect a speed of the haulage vehicle; and a suspension pressure sensor to detect a suspension pressure of the haulage vehicle, and the first arithmetic apparatus divides a coefficient of variation of the suspension pressure by the speed of the haulage vehicle to calculate the road surface condition data.

3. The road surface management system according to claim 1,

Wherein the first arithmetic apparatus calculates a slip ratio of the haulage vehicle on the basis of the signal from the sensor, and further transmits the slip ratio together with the haulage vehicle position data, the second arithmetic apparatus calculates a slip ratio of the repair vehicle on the basis of the signal from the sensor, and further transmits periodically the slip ratio together with the repair vehicle position data, every time the arithmetic apparatus receives the slip ratio through the communication apparatus, the arithmetic apparatus compares the slip ratio against a slip ratio threshold, and then the arithmetic apparatus adds up the numbers of the haulage vehicles and the repair vehicles which each have the slip ratio exceeding the slip ratio threshold, and if a resulting integrated value is equal to or greater than a vehicles threshold value, the arithmetic apparatus resets the road surface condition data on all the segments accumulated in the storage apparatus.

4. A method of managing road surfaces in a road surface management system which divides a travel route, along which a haulage vehicle travels, into a plurality of segments, and manages road surface conditions of the travel route on a segment-by-segment basis, wherein the road surface management system includes: a management server that includes an arithmetic apparatus, a storage apparatus, an output apparatus and a communication apparatus; a haulage vehicle onboard terminal that is installed in the haulage vehicle and includes a first arithmetic apparatus and a first communication apparatus; and a repair vehicle onboard terminal that is installed in a repair vehicle for repairing the travel route, and includes a second arithmetic apparatus and a second communication apparatus, the first arithmetic apparatus calculates road surface condition data on the travel route on the basis of a signal input from a sensor installed in the haulage vehicle, and then the first arithmetic apparatus transmits the road surface condition data thus calculated, combined with haulage vehicle position data which is positional data of the haulage vehicle, to the management server through the first communication apparatus, the second arithmetic apparatus calculates work status data indicating a work status of the repair vehicle, on the basis of a signal input from a sensor installed in the repair vehicle, and then the second arithmetic apparatus transmits periodically the work status data thus calculated, combined with repair vehicle position data which is positional data of the repair vehicle, to the management server through the communication apparatus, the arithmetic apparatus is connected to the communication apparatus, the storage apparatus and the output apparatus, every time the arithmetic apparatus receives the haulage vehicle position data and the road surface condition data through the communication apparatus, the arithmetic apparatus associates the segment including a position specified by the haulage vehicle position data, a reception time-of-day, and the road surface condition data with one another for accumulation in the storage apparatus, every time the arithmetic apparatus receives the repair vehicle position data and the work status data indicating a working state, through the communication apparatus, the arithmetic apparatus resets the road surface condition data accumulated in the storage device in association with the segment including a position specified by the repair vehicle position data, every time the road surface condition data is newly accumulated in the storage apparatus, the arithmetic apparatus determines a prediction function to predict a chronological change in road surface conditions of the segment on the basis of a plurality of pieces of the road surface condition data accumulated on a segment-by-segment basis, according to the prediction function thus determined, the arithmetic apparatus calculates a time to reach a road surface repair threshold value as a repair scheduled time-of-day, and the arithmetic apparatus outputs the repair scheduled time-of-day to the output apparatus.

* * * * *